United States Patent [19]

Randlett et al.

[11] Patent Number: 5,494,209
[45] Date of Patent: *Feb. 27, 1996

[54] METHOD FOR THE MANUFACTURE OF AN INTERNALLY ENHANCED WELDED TUBING

[75] Inventors: Myron R. Randlett; Jerome M. Dupy, both of Cuba, Mo.

[73] Assignee: Olin Corporation, Cuba, Mo.

[ * ] Notice: The term of this patent shall not extend beyond the expiration date of Pat. No. 5,348,213.

[21] Appl. No.: 300,001

[22] Filed: Sep. 1, 1994

Related U.S. Application Data

[63] Continuation-in-part of Ser. No. 997,387, Dec. 28, 1992, Pat. No. 5,348,213.

[51] Int. Cl.[6] ................................. B23K 33/00
[52] U.S. Cl. ................. 228/147; 228/173.3; 228/17.5; 72/368
[58] Field of Search ................................. 228/146, 147, 228/173.3, 171, 17.5; 72/368, 51; 219/61.3; 29/890.053, 890.045

[56] References Cited

U.S. PATENT DOCUMENTS

| | | | |
|---|---|---|---|
| 1,872,276 | 8/1932 | Graham | 72/324 |
| 2,352,276 | 6/1944 | Anderson | 172/459 |
| 3,700,158 | 10/1972 | Schatz et al. | 228/17.5 |
| 3,861,462 | 1/1975 | McLain | 165/179 |
| 3,885,622 | 5/1975 | McLain | 165/179 |
| 3,901,430 | 8/1975 | McLain | 228/146 |
| 3,906,605 | 9/1975 | McLain | 29/890.045 |
| 3,911,710 | 10/1975 | Gest | 72/193 |
| 3,938,724 | 2/1976 | Nakamura et al. | 228/147 |
| 4,025,749 | 5/1977 | Spurr et al. | 219/84 |
| 4,294,095 | 10/1981 | Kawano et al. | 72/368 X |
| 4,493,962 | 1/1985 | Weil et al. | 219/64 |
| 4,568,015 | 2/1986 | Toyooka et al. | 228/147 |
| 4,697,446 | 10/1987 | Yamamoto et al. | 72/128 |
| 4,830,258 | 5/1989 | Lentz et al. | 228/17.5 |
| 4,866,830 | 9/1989 | Zohler | 29/890.048 |
| 4,905,885 | 3/1990 | Hellman, Sr. | 228/144 |
| 4,995,549 | 2/1991 | Hellman, Sr. | 228/147 |
| 5,052,476 | 10/1991 | Sukumoda et al. | 165/133 |

FOREIGN PATENT DOCUMENTS

| | | |
|---|---|---|
| 1446169 | 6/1966 | France . |
| 1288547 | 2/1969 | Germany . |
| 55-30306 | 3/1980 | Japan . |
| 60-3984 | 1/1985 | Japan . |
| 2-108411 | 4/1990 | Japan . |
| 1006138 | 3/1983 | U.S.S.R. . |

*Primary Examiner*—P. Austin Bradley
*Assistant Examiner*—Jeanne M. Elpel
*Attorney, Agent, or Firm*—Gregory S. Rosenblatt

[57] ABSTRACT

A metallic strip having at least one surface enhanced with a texture pattern is formed into a welded tube. A fin insert shapes the edges of the metallic strip prior to welding and minimizes the formation of a protruding weld bead. The longitudinally running edges of the metallic strip adjacent to the enhancement are angled so that the unenhanced portions of the strip edges contact during welding. By having the unenhanced portions contact, fluctuations in metal volume during welding are reduced. This reduces weld instability.

10 Claims, 7 Drawing Sheets

METHOD FOR THE MANUFACTURE OF AN INTERNALLY ENHANCED WELDED TUBING

CROSS-REFERENCE TO RELATED APPLICATION

This patent application is a continuation-in-part of U. S. patent application Ser. No. 07/997,387 by Myron R. Randlett and Jerome M. Dupy that was filed on Dec. 28, 1992, that is now U.S. Pat. No. 5,348,213

FIELD OF THE INVENTION

This invention relates to an apparatus and method for the manufacture of internally enhanced welded heat exchange tubes. More particularly, the invention relates to shaping the edges of a strip to control the flow of a weld bead.

BACKGROUND OF THE INVENTION

Metallic strip is formed into tubing by passing the strip through forming and fin pass rolls deforming the strip into an open tubular shape with the opposing longitudinal edges in close proximity. The strip is then passed through a welding station bonding the longitudinal edges and thus forming a tube.

Subsequent to welding, the tube is typically passed through at least one-set of sizing rolls to form the tube to a desired diameter. The means and apparatus for converting strip to welded tubing is disclosed in U.S. Pat. Nos. 3,700, 158 to Schatz et al, 4,697,446 to Yamamoto et al and 4,905,885 to Hellman, Sr., all of which are incorporated in their entirety by reference herein.

In many heat exchanger applications, the walls of the tube are enhanced by providing a textured surface. A variety of enhancement patterns are known to improve the performance of a heat exchange tube. These patterns include corrugated ridges or diamonds as disclosed in U.S. Pat. No. 3,861,462 to McLain and pear shaped grooves as disclosed in U.S. Pat. No. 5,052,476 to Sukumonda et al.

One problem in the manufacture of welded tube is an extruded weld bead. Excess welding material flows from the weld and accumulates on the inner and outer walls of the tube. Removal of the bead generally involves removal of some base material. While the removal of base material is acceptable from non-enhanced (smooth) tube walls, removal from an enhanced surface results in damage to the enhancement pattern in the weld region and decreased tube performance.

One method to remove the weld bead, used primarily in the manufacture of steel tube, is disclosed in U.S. Pat. No. 2,352,306. An oxygen jet is directed against the weld bead soon after welding while the weld bead is hot. The bead ignites resulting in a smooth weld seam. U.S. Pat. No. 4,905,885 discloses a hydraulically controlled bead reduction roller and a backing roller to flatten the weld bead. Another method is the use of cutting tools.

When the walls of the tube are enhanced, the prior art methods of removing the weld bead are unsatisfactory. Mechanical flattening damages the enhancement. A stream of oxygen is deflected by the enhancement and inadequately ignites the weld bead. Cutting destroys a portion of the enhancement pattern.

SUMMARY OF THE INVENTION

Accordingly, it is an object of the invention to provide both an apparatus and a method for the manufacture of a welded tube that does not require weld bead removal. It is a feature of the invention that the strip edges are shaped by a fin insert to a specific angle directing the weld bead to a location where the impact of the weld bead on the efficiency of the heat exchanger is minimized.

One advantage of the invention is that a welded tube having a reduced weld bead is formed. Another advantage is that increased weld stability is obtained.

In accordance with the invention, there is provided a fin insert for the manufacture of welded tube from metallic strip. The fin insert has a first portion with a positive angle relative to the axis of the fin insert and a second portion with a second angle relative to the axis of the fin insert. The second angle is less than said first angle.

The above-stated objects, features and advantages will become more apparent from the specification and drawings which follow.

DETAILED DESCRIPTION OF THE INVENTION

Figure 1:
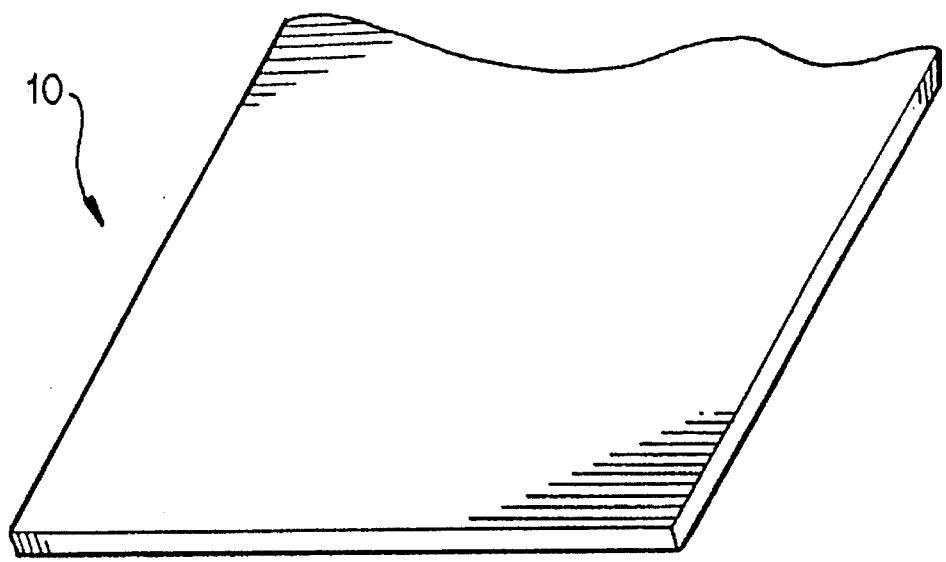
FIG. 1 shows in isometric view a metallic strip for the manufacture of welded tube as known from the prior art.

FIG. 1 shows in isometric view a metallic strip 10 used in the manufacture of welded tube as known from the prior art. The metallic strip 10 has a width slightly larger than the circumference of the desired tube. The thickness of the metallic strip 10 is about equal to or slightly larger than the desired thickness of the tube. The metallic strip 10 can be formed from any metal or metal alloy suitable for welding. For heat exchange applications, the tubing is typically a copper base alloy, an aluminum base alloy, stainless steel or titanium.

Figure 2:
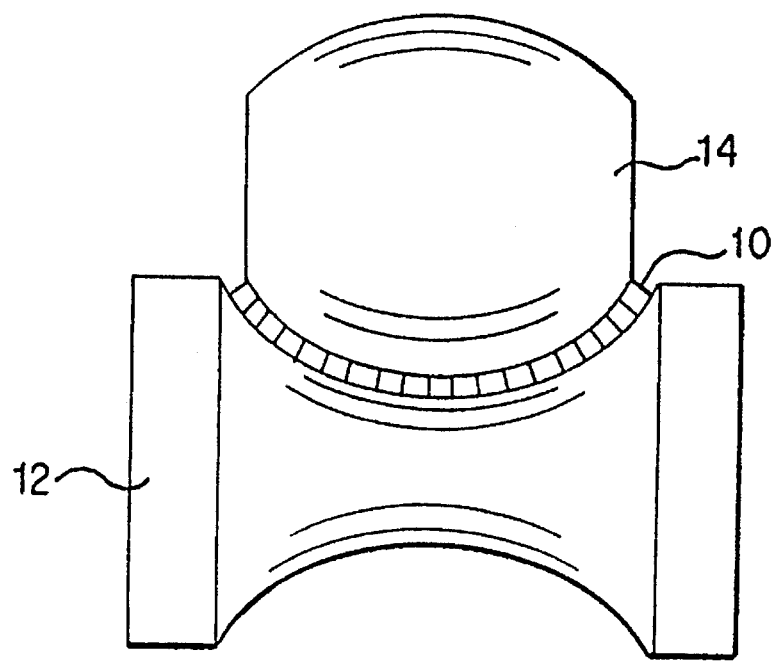
FIG. 2 shows a partial cross-sectional view of a pair of rolls used in the early phase of forming a metallic strip into a tube as known from the prior art.

The metallic strip 10 is formed into an arcuate shape by passing through forming rolls as illustrated in FIG. 2 and known from the prior art. The forming rolls usually include a first forming roll 12 having a concave shape for progressively defining the external radius of the metallic strip 10. A second forming roll 14 having a convex shape progressively defines the inside radius of the metallic strip 10.

Figure 3:
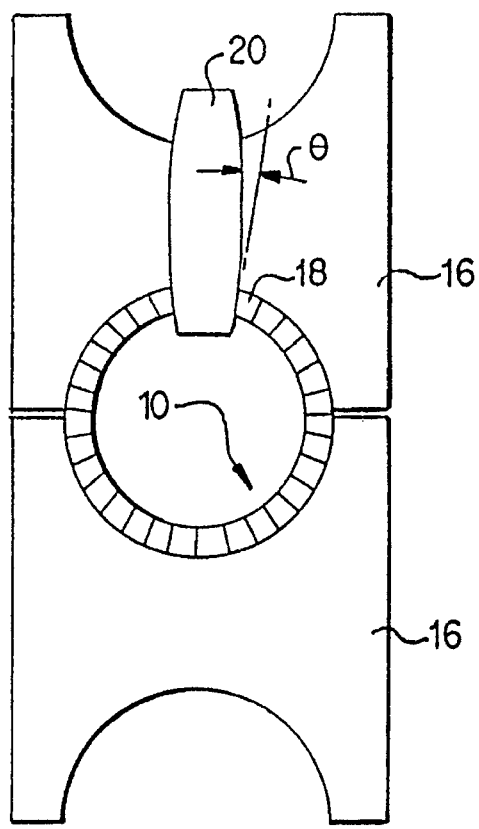
FIG. 3 shows in cross-sectional view a fin insert as known from the prior art.

A series of forming rolls transform the metallic strip 10 into an open tube as illustrated in FIG. 3 and known from the prior art. The longitudinal edges 18 of the metallic strip 10 are aligned and brought in close proximity by fin pass rolls 16. Associated with the top fin pass roll 16 is a fin insert 20. The fin insert shapes the longitudinal edges 18 to provide a consistent presentation of the edges for welding. The fin insert 20 shapes the longitudinal edges 18 of the metallic strip 10 with a desired angle "Θ". Θ is conventionally on the order of from 0° to about 15° and, typically on the order of about 12°. This angle is dependent on both tube diameter and fin (edge) width.

Figure 4:
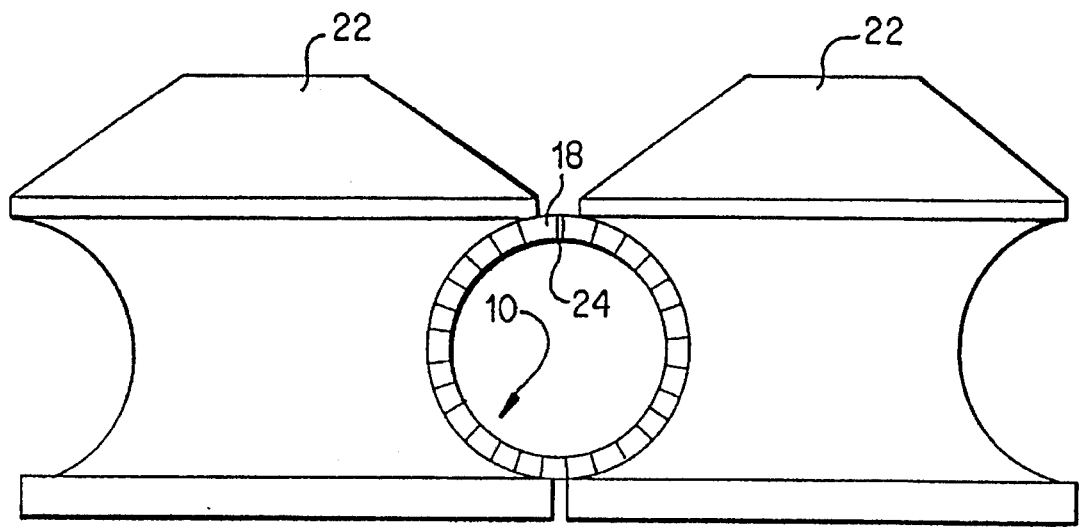
FIG. 4 shows in cross-sectional view a pair of high frequency welding rolls as known from the prior art.

Following shaping of the longitudinal edges 18 of the metallic strip 10, the edges are brought together by welding rolls 22 as illustrated in FIG. 4 and known from the prior art. The longitudinal edges 18 are heated to their melting temperature by either high frequency induction or resistance type heating. The welding rolls 22 cause the longitudinal edges 18 to contact one another. The molten edges fuse forming a weld 24. Excess molten metal is extruded from the weld and accumulates as a bead on both the inner and outer walls of the tube as shown in FIG. 6.

One or more sets of sizing rolls (not shown) may follow the welding rolls to ensure transformation of the as welded tube to a final round tube of a desired diameter.

Figure 5:
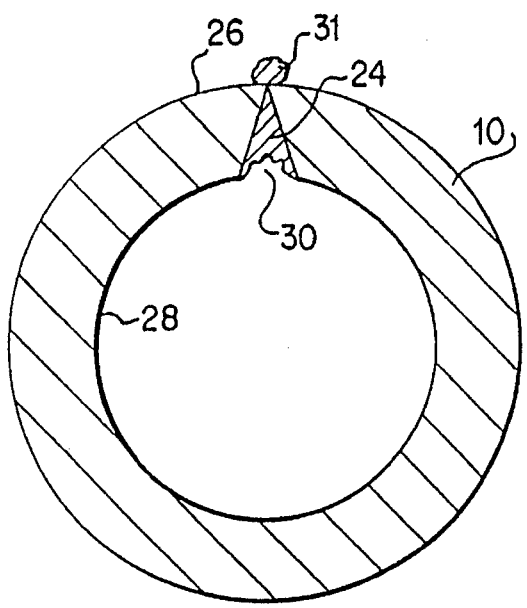
FIG. 5 shows in cross-sectional view a representation of a welded tube in which the fin insert angle was zero.

The angle Θ of the fin insert influences the weld 24. FIG. 5 shows a weld from a fin insert having an angle of 0°. The weld adjacent the outer wall 26 of the tube is solid and forms a good bond. The weld adjacent the inner wall 28 is incomplete due to improper presentation of the strip edges in the weld rolls. A weld free zone 30 creates a depression in the inner wall of the welded tube. The depression weakens the weld and can cause flow disturbances in a liquid passing through the tube. Excess metal is only extruded outward from the weld forming a weld bead 31 on the outer wall 26 of the tube.

Figure 6:
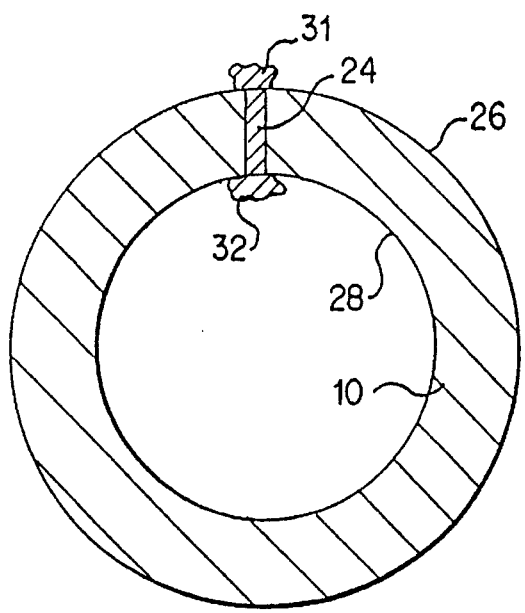
FIG. 6 shows in cross-sectional view of representation of a welded tube in which the fin insert was approximately 12°.

When the angle of the fin insert is about 12°, a weld 24 as illustrated in FIG. 6 is achieved. The weld 24 is consistent from the outer wall 26 through to the inner wall 28 of the tube. Weld beads 31,32 extend from both the inner and outer walls of the tube. Bead 31 is removed by conventional means such as scarfing. The bead 32 must be removed to avoid turbulent flow of a liquid passing through the heat exchange tube. When the inside surface 28 of the welded tube is smooth and the inside diameter of the tube is large, for example, greater than about 8.25mm (0.325 inches), removal of the bead 32 is not difficult. A mandrel or other machining device is passed through the inside bore to either flatten the bead or remove it by scarfing.

While conventional means will remove the bead 32 from large diameter welded tubes having a smooth internal bore, when the inner wall 28 is enhanced removal of the bead is difficult without removal of a portion of the enhancement. It is preferred to minimize the formation of a bead 32 by directing excess metal to the outer wall 26 of the welded tube while maintaining a full weld in the tube metal.

Figure 7:
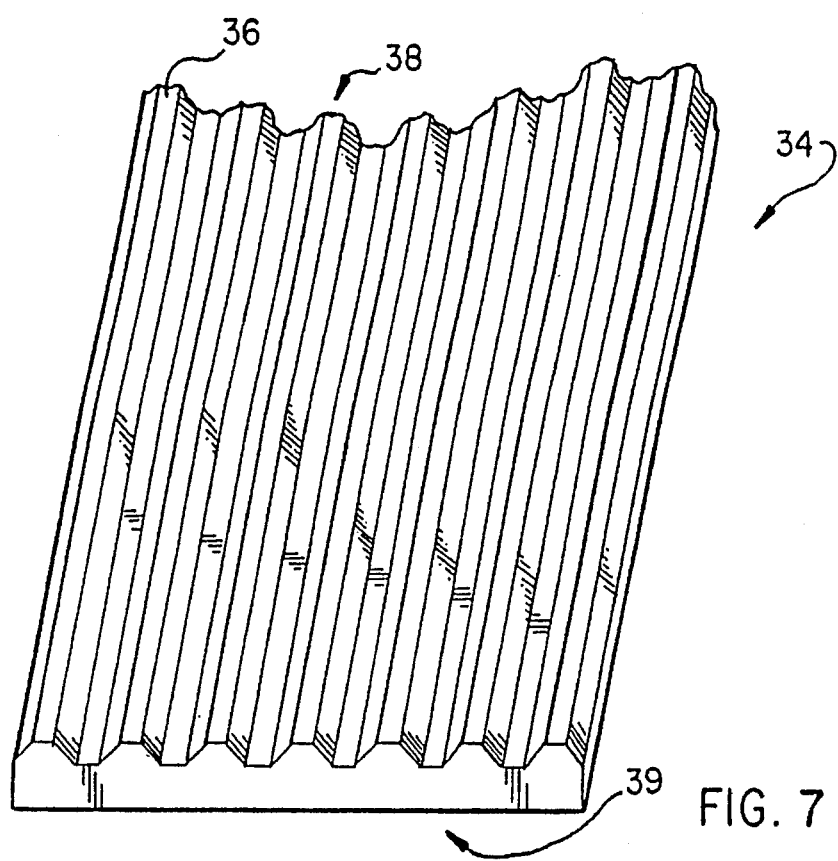
FIG. 7 shows in isometric view a metallic strip to form welded tube having an internally enhanced surface.

FIG. 7 shows in isometric view a metallic strip 34 for forming an internally enhanced welded tube. The enhancement 36 can be formed by milling, scarfing, other subtractive processes or by roll forming. In roll forming, a metallic strip is passed through a pair of rolls, at least one of which is textured to imprint a desired pattern on a surface of the strip. The metallic strip 34 illustrated in FIG. 7 has an enhanced surface 38 and a smooth surface 39. During tube forming, the metallic strip 34 is deformed into a tubular shape with the enhanced surface 38 forming the inner wall.

Figure 8:
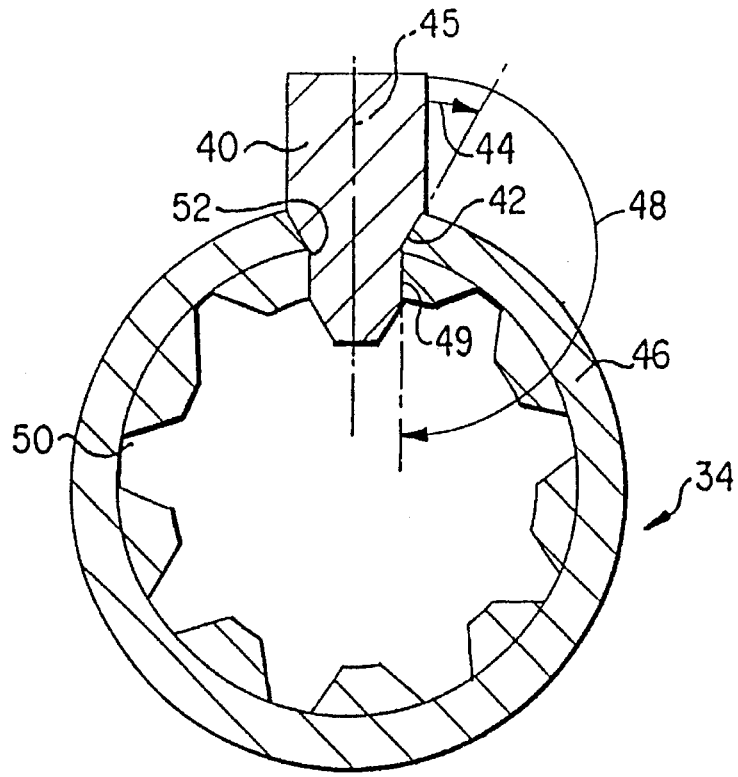
FIG. 8 shows in cross-sectional view a representation of a fin insert in accordance with a first embodiment of the invention.

FIG. 8 illustrates in cross-sectional representation a fin insert 40 in accordance with a first embodiment of the invention. The fin insert 40 imparts two separate angles on the edges 42 of the corrugated metallic strip 34. The fin insert has a first portion forming a first angle 44 relative to the center line axis 45 of the fin insert.

Throughout this disclosure, all angles are measured in a clockwise direction from the portion of the center line axis of the fin insert adjacent to the outer wall of the tube.

The first angle 44 is any value greater than zero. Preferably, the first angle 44 is from about 6° to about 18° and most preferably from about 10° to about 15°. The preferred values for the first angle 44 are most effective when the tube diameter is about 16mm (0.625 inch). The preferred values may vary somewhat for other tube diameters. The first angle shapes substantially that portion 46 of the strip which is not enhanced.

A second portion 49 of the fin insert 40 forms an angle 48 defined by the second portion 49 of the fin insert 40 and the centerline axis 45 of the fin insert 40. The second angle 48 shapes the edges of the enhanced portion 50 of the strip. The value of (180° minus second angle) is less than the first angle 44 but equal to or greater than zero. Preferably, the second angle is from about 175° to about 180°.

The first angle 44 shapes the edges of the base portion 46 of the enhanced strip 34 and the second angle 48 shapes the edges of the enhanced portion 50 of the strip. It is not necessary for the inflection point 52 to be at the intersection of the enhanced portion and the base portion. Preferably, the first angle 44 shapes from about 20% to about 100% of the base portion of the strip. More preferably, the first angle 44 shapes from about 60% to about 100% of the base portion. Similarly, the second angle 48 should preferably shape from about 20% to about 100% of the enhanced portion of the strip and preferably from about 75% to about 100% of the enhanced portion.

Figure 9:
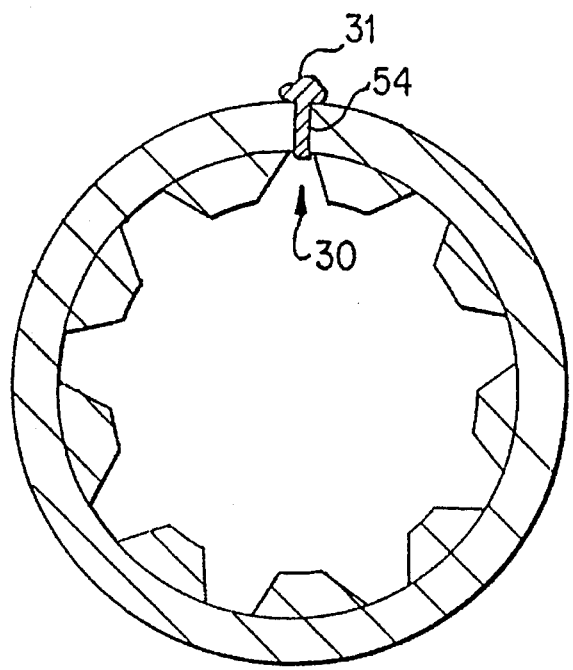
FIG. 9 shows in cross-sectional representation the weld achieved with the fin insert of FIG. 8.

FIG. 9 illustrates in cross-sectional representation the weld 54 formed from the fin insert. The weld 54 forms a consistent solid weld throughout the base portion and a small weld free zone 30 in the enhanced portion. The weld 54 forms a minimal internal bead to interfere with the flow of liquid through the tube. The weld free zone 30 is smaller than the grooves of the enhanced surface so the effect on flow is minimal. The external bead 31 is easily removed without damage to the enhancement pattern.

Figure 10:
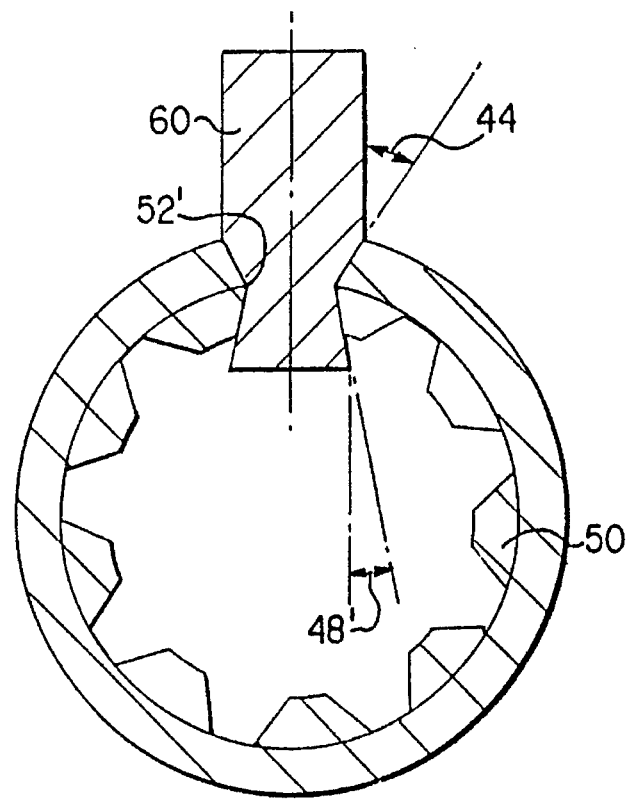
FIG. 10 shows in cross-sectional view a representation of a fin insert in accordance with a second embodiment of the invention.

FIG. 10 shows a fin insert 60 in accordance with a second embodiment of the invention. The fin insert 60 has a first angle 44 having a positive value similar to that of the preceding embodiment. The second angle 48' is any angle less than 180°. Preferably, the second angle is from about 170° to about 180° and most preferably, from about 175° to about 179°. An inflection zone 52' in the region where the enhanced portion 50 terminates, converts the fin insert from the positive first angle 44 to the second angle 48' with a small zero degree region. Preferably, this zero degree region has a length of from about 10% to about 30% the thickness of the non-enhanced portion of the base metal.

Figure 11:
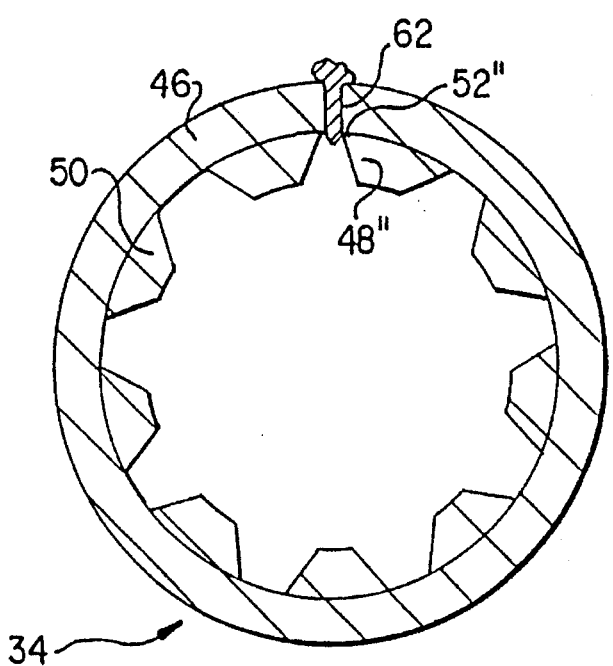
FIG. 11 shows in cross-sectional view a representation of the weld bead achieved with the fin insert of FIG. 10.

As shown in cross-sectional representation in FIG. 11, the first angle produces a solid weld bead 62 in the base portion 46 of the metallic strip 34. The second angle forces the material out of the enhanced region such that the weld tapers off in the inflection zone 52" and there is no weld in the second angle zone 48" of the enhanced portion 50. The use of the fin insert produces a weld 62 with a very minimal effect on the enhancement. A fluid flowing through the welded tube of the second embodiment is exposed to a consistent surface with minimal disturbance from a weld bead or the unwelded zone. No processing is required to remove an inner weld bead.

While the invention has been described in terms of welded tube having an internally enhanced surface, it is equally applicable to welded tubes having both internally and externally enhanced surfaces. Further, the fin insert configurations of the invention are particularly suited for small bore welded tubes from which removal of a bead would be difficult.

Figure 12:
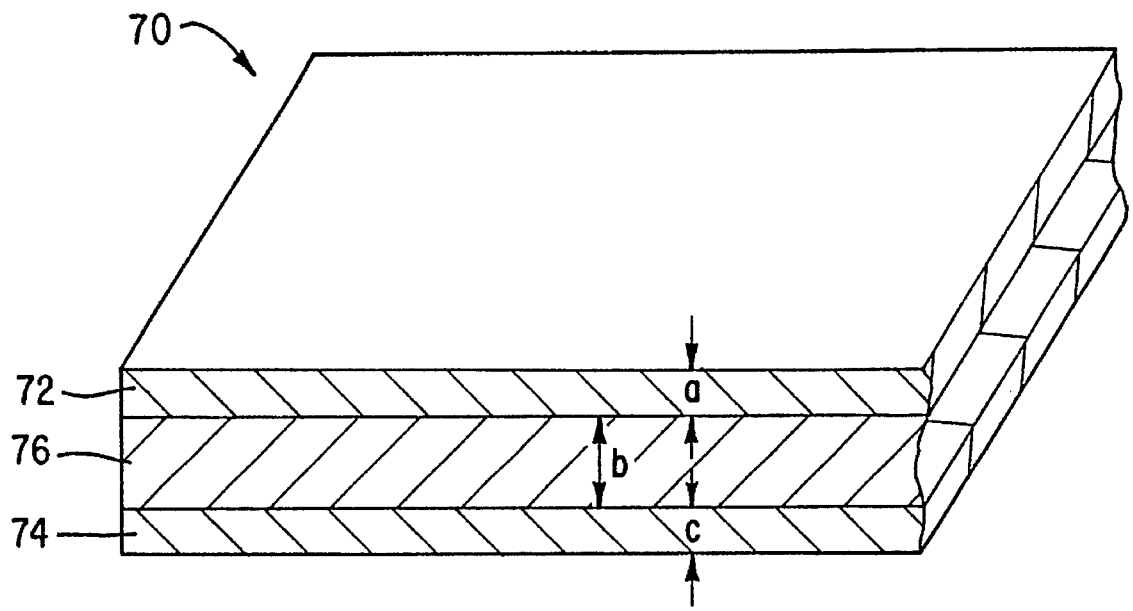
FIG. 12 shows in isometric view a representation of a metallic strip enhanced on two sides.

FIG. 12 illustrates in partial cross-sectional representation a metallic strip 70 having a first enhancement 72 formed on a first side of the metallic strip 70. The first side of the metallic strip is defined as that side that forms the outer wall of the tube. A second enhancement 74 is formed on a second side of the metallic strip 70. Disposed between the first enhancement 72 and the second enhancement 74 is an unenhanced base metal section 76. It is not necessary for the first and second enhancements to be the same. One enhancement may comprise subsurface channels terminating at small surface pores to promote nucleate boiling. The other enhancement may be truncated cones to enhance turbulent flow.

The cross sectional thickness of the first enhancement 72 is designated "a"; of the base section 76 "b"; and of the second enhancement 74 "c" as illustrated in FIG. 12.

Figure 13:
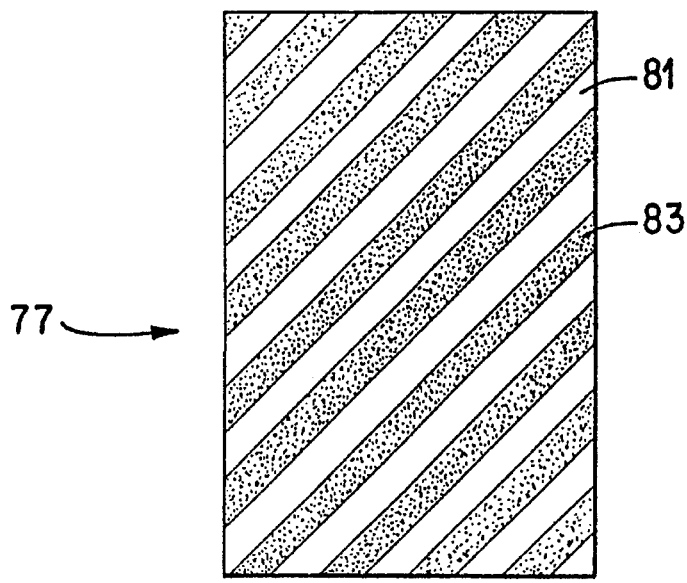
FIG. 13 shows in top planar view a metallic strip to form welded tube having an enhanced surface.

When an enhanced metallic strip is formed into an arcuate shape, if the enhancements along both longitudinal edges align, a consistent volume of metal from each edge forms the weld. If, however, the volume of metal along the longitudinal edges varies as for forming a helical enhancement, the varying thickness along the edges causes fluctuation in the amount of metal surface available for electrical contact. This varying load creates an unstable welding condition. FIG. 13 illustrates in top planar view such an enhanced metallic strip 77. The thickness of the metallic strip alternates between elevated regions 81 and recessed regions (stippled) 83. Absent the fin insert of the invention, welding the longitudinal edges of the strip 77 causes electrical fluctuations and weld instability.

Figure 14:
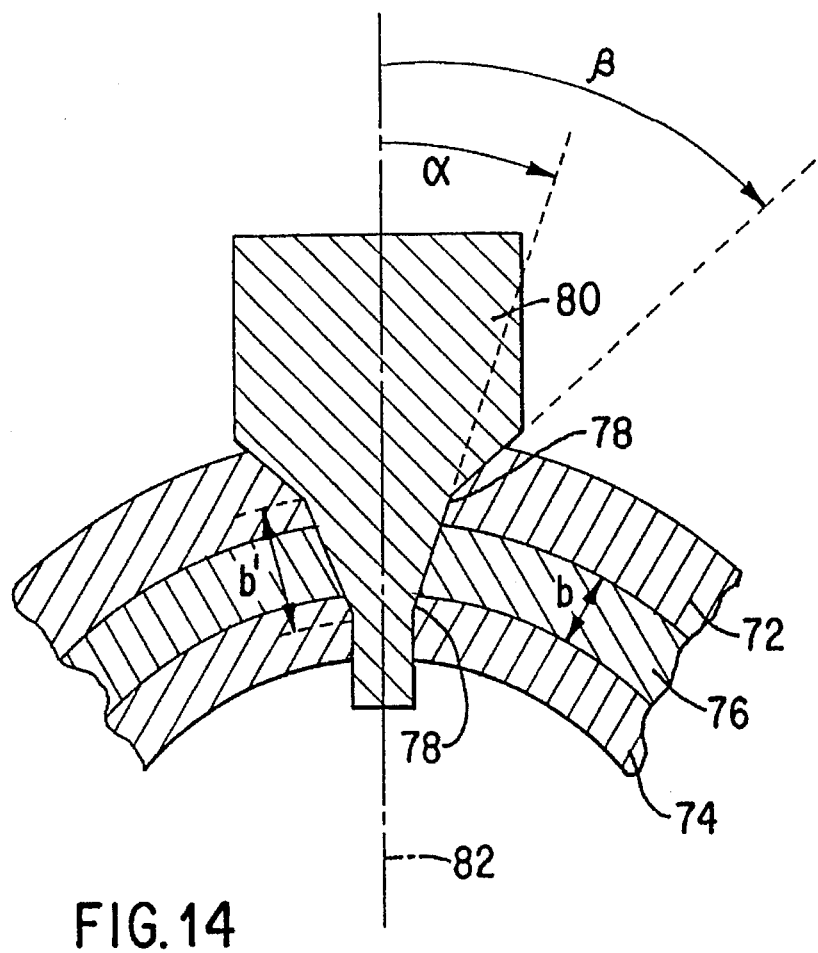
FIG. 14 shows in cross-sectional view a representation of a fin insert in accordance with a third embodiment of the invention.

By shaping the longitudinal edges of the metallic strip properly, as shown in FIG. 14, the base section 76 predominates in the weld seam and the effect of the welding enhancement on weld stability is minimized. To ensure that the base section 76 is fully welded, a small portion 78 of an enhanced section is shaped to the same angle as the base section 76. This small portion 78 is taken from either enhanced region and preferably, is taken substantially equally from the first enhancement 72 and from the second enhancement 74. As a result, the length, b', of that portion of the metallic strip shaped to the same angle as the base section 76 is from about (b+0.05a+0.05c) to about (b+0.2a+0.2c). The length of b' is increased by the sum of 5% the length of a plus 5% the length of c to 20% the length of a plus 20% the length of c. More preferably, b' is from about (b+0.08a+0.08c) to about (b+0.12a+0.12c).

The fin insert 80 shapes the base section 76 to an angle α, relative to the centerline axis 82 of the fin insert and measured in a clockwise direction from the outside wall of the tube of from about 5° to about 30° and more preferably, of from about 10° to about 20°.

The angle β between the fin insert 80 and the first enhanced portion 72 is, in degrees, from about (α+1°) to about (α+15°) and more preferably from about (α+2°) to about (α+10°). The second enhanced portion 74 is preferably shaped to be essentially parallel to the centerline axis 82 of the fin insert.

Figure 15:
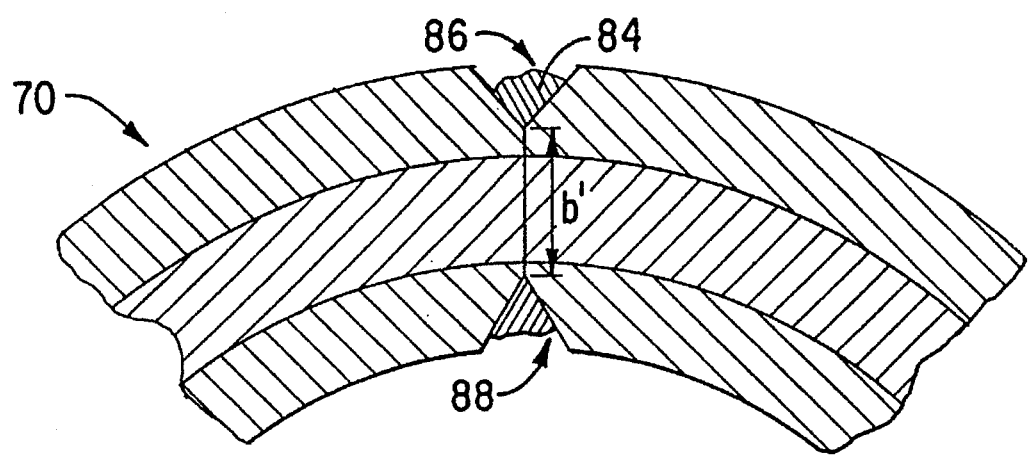
FIG. 15 shows in cross-sectional view a representation of the weld bead obtained with the fin insert of FIG. 14.

When the edges of the metallic strip 70 are brought together in the welding roll, as shown in FIG. 15, the b' surfaces are in full contact for welding when heated. A weld bead 84 flows both into the outer gap 86 and the inner gap 88, at least partially filling both but does not extend beyond the inside or outside diameter of the welded tube. Preferably, the fin insert shapes the longitudinal edges such that the inner gap 88 has a volume slightly larger than the volume of the weld bead displaced into the respective gap.

The patents set forth in this application are intended to be incorporated by reference herein.

It is apparent that there has been provided in accordance with this invention, a method for forming internally enhanced welded tubing which fully satisfies the objects, means and advantages set forth hereinabove. While the invention has been described in combination with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

We claim:

1. A method for the manufacture of an internally enhanced welded tube from a metallic strip having first and second opposing surfaces, comprising the steps of:

a) forming a pattern on at least a first surface of a metallic strip;

b) forming said metallic strip into a tubular shape with said first surface forming the inner wall;

c) shaping the longitudinal edges of said metallic strip to at least two different angles by passing said metallic strip through fin pass rolls that include an associated fin insert wherein a first portion of said longitudinal edges adjacent said second surface is shaped to a first angle relative to a centerline axis of said fin insert and a second portion of said longitudinal edges adjacent said first surface is shaped to a second angle, wherein the first angle is greater than (180°-second angle);

d) contacting said edges of said metallic strip; and e) welding said edges together.

2. The method of claim 1 wherein said first portion is shaped to an angle of from about 6° to about 18° relative to said centerline axis.

3. The method of claim 2 wherein said first portion is shaped to an angle of from about 10° to about 15° relative to said centerline axis.

4. The method of claim 2 wherein said second portion is shaped to an angle of from about 175° to about 180° relative to said centerline axis.

5. A method for the manufacture of an internally enhanced welded tube from a metallic strip, comprising the steps of:

a) forming a first enhancement on a first side of said metallic strip, said first enhancement having a cross-sectional thickness of "a";

b) forming a second enhancement on an opposing second side of said metallic strip, said second enhancement having a cross-sectional thickness of "c", wherein an unenhanced base portion having a cross sectional thickness of "b" is disposed between said first enhancement and said second enhancement;

c) forming said metallic strip into a tubular shape with said first side forming the outer wall;

d) shaping the longitudinal edges of said metallic strip to at least three different angles by passing said metallic strip through fin pass rolls that include an associated fin insert wherein the base portion is shaped to an angle "α" of from about 5° to about 30° relative to a centerline axis of said fin insert, the portion adjacent said first enhancement is shaped to an angle, "β", relative to said centerline axis where β is from about (α+1°) to about (α+15°) and the portion adjacent said second enhancement is essentially parallel to said centerline axis;

e) contacting said edges of said metallic strip; and f) welding said edges together.

6. The method of claim 5 wherein the portion of said longitudinal edge shaped to the angle "α" has a length of from about (b+0.05a+0.05c) to about (b+0.20a+0.20c).

7. The method of claim 6 wherein the portion of said longitudinal edge shaped to the angle "α" has a length of from about (b+0.08a+0.08c) to about (b+0.12a+0.12c).

8. The method of claim 6 wherein "α" is from about 10° to about 20°.

9. The method of claim 8 wherein "β" is from about (α+2°) to about (α+10°).

10. The method of claim 6 wherein "β" is from about (α+2°) to about (α+10°).

* * * * *